United States Patent Office
>
> 3,373,810
> Patented Mar. 19, 1968

3,373,810
WATERFLOOD PROCESS EMPLOYING
THICKENED WATER
Sherrod A. Williams, Dallas, Tex., assignor to Mobil Oil
Corporation, a corporation of New York
No Drawing. Filed June 17, 1966, Ser. No. 558,254
19 Claims. (Cl. 166—9)

This invention pertains to recovering liquid petroleum hydrocarbons, more commonly called oil, from a subterranean formation. More particularly, it pertains to a method of recovering oil by injecting thickened water through an injection well into the formation to displace the oil therein so that it may be recovered from a production well leading from the surface of the earth to the formation.

Oil accumulated within a subterranean formation can be recovered, or produced, through wells from the formation using the natural energy within the formation. However, producing operations deplete the natural energy relatively rapidly. Thus, a large amount of the oil is left in a subterranean formation if only the natural energy is used to produce the oil. This production by depletion of the natural energy is often referred to as primary production. Where natural formation energy is inadequate or has become depleted, supplemental operations, often referred to as secondary recovery operations, are used to improve the extent of recovery of the oil. In the most successful and most widely used supplemental recovery operations, a fluid is injected through an injection means, comprising one or more injection wells. The fluid is passed into the formation, displacing oil within and moving it through the formation. The oil is produced from production means, comprising one or more production wells, as the injected fluid passes from the injection means toward the production means. In a particular recovery operation of this sort, water is employed as the injected fluid, and the operation is referred to as waterflooding. The injected water is referred to as the flooding water as distinguished from the in-situ, or connate, water.

While conventional waterflooding is effective in obtaining additional oil from an oil-containing subterranean formation, it has a number of shortcomings. Foremost among these shortcomings is the tendency of flooding water to "finger" through an oil-containing formation and to bypass substantial portions thereof. By fingering is meant the developing of unstable bulges or stringers which advance toward the production means more rapidly than the remainder of the flooding water. Furthermore, the water does not normally displace as much oil in the portions of the formation which it contacts as it potentially is capable of doing.

It has been established that waterfloods perform less satisfactorily with viscous oils than with relatively non-viscous oils. The fingering and bypassing tendencies of the water are more or less directly related to the ratio of the viscosity of the oil to the viscosity of the flooding water. The viscosities of different oils vary from as low as 1 or 2 centipoises to 1,000 centipoises, or higher. Water has a viscosity of about 1 centipoise.

Past suggestions for increasing the viscosity of flooding water have included incorporating water-soluble thickening additives in the water. Additives that have been suggested for this purpose include a wide variety of naturally occurring gums, sugars, and polymers. The bacterially produced heteropolysaccharides have been especially interesting as additives for thickening flooding water. It has been suggested to react the bacterially produced heteropolysaccharides with bactericides such as formaldehyde or the quaternary ammonium salts to produce thickening agents for use in flooding water.

While these additives are effective to an extent in increasing the viscosity of the flooding water, they are plagued by one or more serious disadvantages. Some of the additives are effective only in restricted ranges of temperatures and pH values. Many of the additives form insoluble precipitates with divalent ions, such as calcium ions, either in the flooding water or in the in-situ fluids. A major disadvantage suffered by most of the aqueous solutions of these additives is a severe reduction in viscosity of the aqueous solution when contacted with brines, such as solutions containing sodium chloride or calcium chloride. Another major disadvantage which is suffered generally by flooding water containing thickening agents is the adsorption of the thickening agents from the thickened flooding water onto the surfaces of the subterranean formation with consequent reduction in viscosity.

Accordingly, it is an object of the invention to provide a method of recovering oil from an oil-containing subterranean formation by flooding oil from the formation with a thickened flooding water which retains its high viscosity in the presence of a fairly wide range of temperatures and pH values.

It is another object of the invention to provide a method of recovering oil from an oil-containing subterranean formation by flooding oil from the formation with a thickened water which does not form objectionable precipitates with the divalent ions in the flooding water or in the in-situ fluids.

It is a particular object of the invention to provide a method of recovering oil from an oil-containing subterranean formation by flooding oil from the formation with a thickened flooding water which does not undergo a severe reduction in its high viscosity in the presence of brines, either as the flooding water or in the formation.

It is a primary object of the invention to provide a method of recovering oil from an oil-containing subterranean formation by flooding the oil from the formation with a thickened flooding water which suffers minimal loss of thickening agent by adsorption onto the surfaces of the subterranean formation.

Further objects and attendant advantages of the invention will be apparent from the following description.

The objects are accomplished in accordance with the invention as follows. Oil is recovered from an oil-containing subterranean formation penetrated by an injection means and a production means by injecting through the injection means and into the formation flooding water containing as a thickening agent a sulfoalkylated poly(glucosylglucan), a sulfoalkylated polysaccharide B-1459, or a mixture thereof;

the sulfoalkylated poly(glucosylglucan) comprising the reaction product formed by reacting poly(glucosylglucan), the glucosylglucan having the structural formula

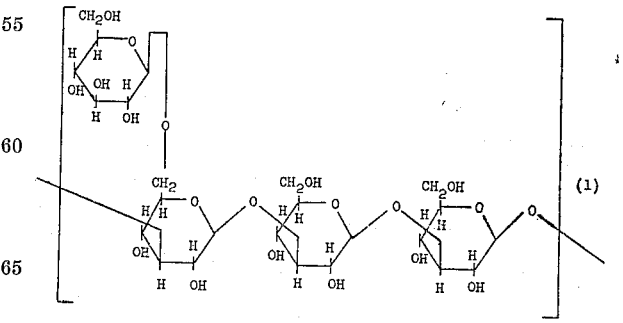

with a sulfoalkylating agent, and the sulfoalkylated polysaccharide B-1459 comprising the reaction product formed by reacting polysaccharide B-1459, the heteropolysaccharide produced by bacterium *Xanthomonas campestris* NRRL B-1459, United States Department of Agriculture, from glucose, with the sulfoalkylating agent.

Primarily because of the introduction of the electronegative sulfoalkyl groups into the polymer, the sulfoalkylated poly(glucosylglucan) or the sulfoalkylated polysaccharide B–1459 has little tendency to adsorb onto the negative adsorption sites, such as the silicate surfaces, in the subterranean formation. Moreover, they do not suffer a severe loss in thickening efficiency in the presence of brines. Furthermore, they are effective over a fairly wide range of temperatures and pH values, and they do not form precipitates with divalent ions in the flooding water or in the formation.

As used herein, the term "solutions" incorporates dispersions which do not deposit filter cake upon injection into a core sample of a subterranean formation, whether or not the dispersions are true solutions. Also, the term "thickened water" is used to denote the flooding water which has been thickened by addition of a sulfoalkylated poly(glucosylglucan), a sulfoalkylated polysaccharide B–1459, or a mixture thereof.

The poly(glucosylglucan) reactant is composed primarily of glucosylglucan repeating units. As illustrated in Formula 1 the glucosylglucan repeating unit comprises multiple glucose molecules which are linked beta 1 to 3 to form the chain skeleton. Onto each third glucose molecule there is appended a glucose molecule linked beta 1 to 6. The larger the number of repeating units in the poly(glucosylglucan), i.e., the higher the molecular weight, the higher will be the viscosity of an aqueous solution containing a given weight percent of the sulfoalkylated poly(glucosylglucan). Thus, for the sulfoalkylated poly(glucosylglucan) to be useful in waterflooding, the molecular weight of the poly(glucosylglucan) reactant should be high enough to afford a relatively large increase in the viscosity of water at a relatively minute concentration. Ordinarily, the poly(glucosylglucan) should have a molecular weight such that its 1 percent by weight aqueous solution has a viscosity at 24° C. of at least 500 centipoises when tested at 30 revolutions per minute on a Brookfield viscometer using a No. 3 spindle. Preferably, it should have a molecular weight such that its 1 percent by weight aqueous solution has the comparable viscosity of from about 2,000 to about 3,000 centipoises. The most preferred poly(glucosylglucan) has a molecular weight such that its 1 percent by weight aqueous solution has the comparable viscosity of about 2,600 centipoises.

A satisfactory poly(glucosylglucan) is commercially available under the trade name "Polytetran" from The Pillsbury Company, Minneapolis, Minn. 55402.

The other reactant, the polysaccharide B–1459, was produced and named at the United States Department of Agriculture's Northern Regional Research Laboratory, Peoria, Ill., hence the inclusion of the NRRL B–1459 designation for the particular strain of the bacterium *Xanthomonas campestris* which produces the superior heteropolysaccharide. It contains D-glucose, D-mannose, and D-glucuronic acid groups in the ratio of 2.8:3.0:2.0. It also contains from about 3 to about 3.5 percent by weight pyruvic acid and about 4.7 percent by weight acetic acid. The acetic acid exists as the O-acetyl ester, whereas pyruvic acid is attached through a ketal linkage. A more detailed description of the polysaccharide B–1459 appears in the following published references:

(1) "Exocellular Bacterial Polysaccharide From *Xanthomonas Campestris* NRRL B–1459, Part I. Constitution," by J. H. Sloneker and Allene Jeanes, Canadian Journal of Chemistry, volume 40 (1962), pp. 2066–2071;
(2) "Exocellular Bacterial Polysaccharide From *Xanthomonas Campestris* NRRL B–1459, Part II. Linkage of the Pyruvic Acid," by J. H. Sloneker and Danute G. Orentas, Canadian Journal of Chemistry, volume 40 (1962), pp. 2188–2189;
(3) "Exocellular Bacterial Polysaccharide From *Xanthomonas Campestris* NRRL B–11459, Part III. Structure," by J. H. Sloneker, Danute G. Orentas, and Allene Jeanes, Canadian Journal of Chemistry, volume 42 (1964), pp. 1261–1269; and
(4) "Polysaccharide B–1459: A New Hydrocolloid Polyelectrolyte Produced From Glucose by Bacterial Fermentation," by Allene Jeanes, J. E. Pittsley, and F. R. Senti, Journal of Applied Polymer Science, vol. V, Issue No. 17, pp. 519–526 (1961).

Furthermore, a method of preparing the polysaccharide B–1459 has been published in the following references:

(1) A. Jeanes, J. E. Pittsley, and F. R. Senti, Journal of Applied Polymer Science, vol. V, 519 (1961); and
(2) S. P. Rogovin, R. F. Anderson, and M. C. Cadmus, Journal of Biochemical and Microbiological Technology and Engineering, vol. III, 51 (1961).

Briefly, the polysaccharide B–1459 is produced by culturing bacterium *Xanthomonas campestris* NRRL B–1459, United States Department of Agriculture, on a well-aerated medium of pH about 7 containing commercial glucose, organic nitrogen sources, dipotassium hydrogen phosphate, and appropriate trace elements. Preferred fermentation temperature during the culturing is about 28° C. The fermentation reaction is complete in about 96 hours or less. Cells and suspended impurities are removed from the fermentation product by centrifugation after adjusting the pH to from 5 to 6. The polysaccharide B–1459 is precipitated from the centrifuged fermentation product by adding salt and low-molecular weight alcohol thereto.

The polysaccharide B–1459 produced by the bacterium *Xanthomonas campestris* is a relatively standard product. Its molecular weight is estimated to be in the millions, judging from the fact that a 1 percent by weight aqueous solution of the polymer has a viscosity of about 3,000 centipoises when measured at 25° C. on a Brookfield LVT viscometer at 30 revolutions per minute.

A suitable polysaccharide B–1459 is commercially available under the trade name "Kelzan" from the Kelco Company, San Diego, Calif. 92123.

If desired, the poly(glucosylglucan) or the polysaccharide B–1459 may be oxyethylated before it is sulfoalkylated. The oxyethylation reaction is simply the addition of ethylene oxide moieties into the poly(glucosylglucan) or polysaccharide B–1459 at elevated temperature and pressure. The oxyethylation reaction is well known and it is not believed necessary to describe it in detail herein.

Any amount of oxyethylation may be employed. Ordinarily, the poly(glucosylglucan) or the polysaccharide B–1459 is oxyethylated until an increase in weight of at least 10 percent is effected. Usually, the poly(glucosylglucan) or the polysaccharide B–1459 is not oxyethylated beyond a gain in weight of about 200 percent. Expressed otherwise, the poly(glucosylglucan) or the polysaccharide B–1459 may have from 10 to 200 percent by weight of ethylene oxide in association therewith when it is sulfoalkylated.

The sulfoalkylating agent may be any of the well-known, reactive agents which will yield an alkyl group and a sulfonate group for addition to the other reactant. Satisfactory sulfoalkylating agents include vinyl sulfonic acid, one of its reactive salts, β-chloroethyl sulfonic acid, one of its reactive salts, or propanesultone. By reactive salt is meant a salt which will effect the sulfoalkylation of the poly(glucosylglucan) or the polysaccharide B–1459. Illustrative reactive salts of the respective sulfoalkylating acid agents are the monovalent salts such as the ammonium salts, the substituted ammonium salts, or the alkali metal salts, i.e., the salts containing a lithium ion, a sodium ion, a potassium ion, or a cesium ion. Specifically illustrative are the following sulfoalkylating agents based on vinyl sulfonic acid: vinyl sulfonic acid, ammonium vinyl sulfonate, ethyl substituted ammonium vinyl sulfonate, lithium vinyl sulfonate, sodium vinyl sulfonate, potassium vinyl sulfonate, and cesium vinyl sulfonate. As a practical matter, the sodium reactive salt of the acid sulfoalkylating agents generally will be employed in carrying out the sulfoalkylation of the poly(glucosylglucan) or the polysaccharide B-1459.

The sulfoalkylation reaction is well known. An early patent, U.S. Patent No. 2,580,352 to Vernon R. Grassie, entitled Preparation of Sulfoethyl Ethers of Polysaccharides, describes one such process. A later patent, U.S. Patent No. 3,046,272 to Jan Strating et al., entitled Polysaccharide-Sultone Reaction Products, describes a second such sulfoalkylation. Briefly, the reactants are mixed in a reactor. A base, such as sodium hydroxide, is added to the reactor. The reactor and constituents contained therein are heated to a suitable temperature, e.g., between about 40° C. and 80° C. The reaction is allowed to proceed for a suitable period of time, e.g., from one to several hours. The sulfoalkylated reaction products may be added directly to the flooding water. Alternatively, the sulfoalkylated poly(glucosylglucan) or sulfoalkylated polysaccharide B-1459 may be isolated by extraction and purified before being dissolved in the flooding water.

The sulfoalkylation reactions are illustrated by the following equations in which

represents either poly(glucosylglucan) or polysaccharide B-1459:

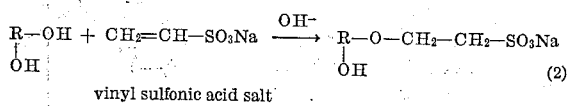

vinyl sulfonic acid salt

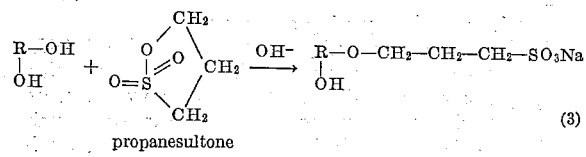

propanesultone

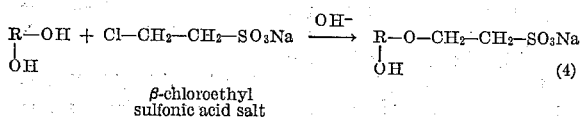

β-chloroethyl sulfonic acid salt

The sulfoalkylated poly(glucosylglucan), the sulfoalkylated polysaccharide B-1459, or a mixture thereof is employed in the flooding water in an amount sufficient to increase its viscosity. In rare instances, a total concentration as small as 0.005 percent by weight will be satisfactory. Usually, a total concentration of from about 0.05 to about 0.3 percent by weight is employed. In rare instances in which it is desired to plug partially an extremely permeable stratum within a subterranean formation, it may be desirable to employ as high as 1 percent by weight, or more, of the sulfoalkylated poly(glucosylglucan), the sulfoalkylated polysaccharide B-1459, or a mixture thereof in the flooding water.

The thickened flooding water may comprise the entire flooding liquid displacing the oil within the subterranean formation toward the production means. Ordinarily, however, a slug of thickened flooding water of from about 0.01 to about 0.25 pore volume will prove to be economically advantageous in recovering the oil from the subterranean formation.

The sulfoalkylated poly(glucosylglucan) and sulfoalkylated polysaccharide B-1459 are each subject to bacterial decomposition after a time. Consequently, the flooding water which has been thickened by their addition loses some of its high viscosity after a period of time in the formation. This bacterial decomposition is prevented by adding a bactericide to the thickened flooding water.

The preferred bactericide is formaldehyde. The alkali metal chlorinated phenols, such as sodium pentachlorophenol, may be employed as the bactericide also.

The bactericide is incorporated into the thickened flooding water in an amount sufficient to prevent appreciable decay of viscosity through bacterial degradation of the sulfoalkylated poly(glucosylglucan) or of the sulfoalkylated polysaccharide B-1459. Ordinarily, an amount of bactericide of at least 0.0002 percent by weight is employed. Greater concentrations of bactericide have no adverse effect on the viscosity and may be employed. Ordinarily, it is not economically advantageous to employ more than about 0.5 percent by weight of bactericide in the the thickened flooding water.

Preferably, the pH of the thickened flooding water is maintained in the range of from about 7 to about 10.5. The thickened flooding water retains its higher viscosity over a somewhat wider range of pH values. The preferred range may be attained by employing in the thickened flooding water an alkali metal hydroxide; an alkaline complex phosphate such as tetrasodium pyrophosphate or tripolyphosphate; or an alkali metal carbonate. The alkali metal carbonates are particularly beneficial since they tend to buffer the pH of the thickened flooding water and the desired range even when added in excess to the amount initially required.

The thickened flooding water recovers more oil when the interfacial tension between it and the in-situ oil is lowered. Preferably, the thickened flooding water has a surfactant dissolved in it. An illustrative surfactant is a petroleum sulfonate having a molecular weight of from about 300 to about 500. Specifically, "Petronate L," available from Witco Chemical Company, Inc., Sonneborn Division, 277 Park Avenue, New York, N.Y. 10017, is a suitable petroleum sulfonate surfactant.

A concentration of surfactant is employed which will effect lowered interfacial tension between the thickened flooding water and the oil it displaces within the subterranean formation. Ordinarily, a concentration of from about 0.01 to about 1.0 percent by weight of surfactant is required in the thickened flooding water to be effective.

The equipment which is conventionally employed in carrying out a waterflood may be employed in carrying out the method of the invention.

Having thus described the invention, it will be understood that such description has been given by way of illustration and example and not by way of limitation, reference for the latter purpose being had to the appended claims.

What is claimed is:

1. A method of recovering oil from an oil-containing subterranean formation penetrated by an injection means and a production means which comprises injecting through said injection means and into said formation flooding water containing as a thickening agent a sulfoalkylated poly(glucosylglucan), a sulfoalkylated polysaccharide B-1459, or a mixture thereof;
   said sulfoalkylated poly(glucosylglucan) comprising the reaction product formed by reacting poly(glucosylglucan), the glucosylglucan having the structural formula

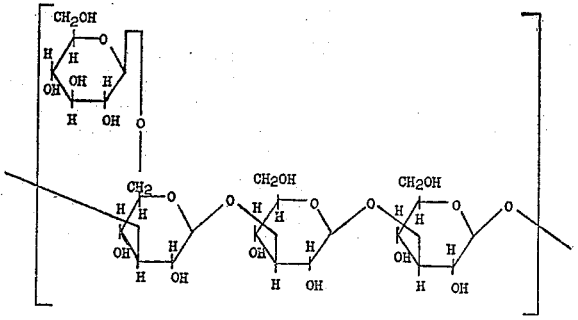

with a sulfoalkylating agent, and said sulfoalkylated polysaccharide B-1459 comprising the reaction product formed by reacting polysaccharide B-1459, the heteropolysaccharide produced by bacterium *Xanthomonas compestris* NRRL B-1459, United States Department of Agriculture, from glucose with said sulfoalkylating agent.

2. The method of claim 1 wherein said sulfoalkylating agent is either vinyl sulfonic acid, one of its reactive salts, β-chloroethyl sulfonic acid, one of its reactive salts, or propanesultone.

3. The method of claim 2 wherein said thickening agent is in a concentration of from about 0.01 to about 0.3 percent by weight of said flooding water.

4. The method of claim 1 wherein said thickening agent is in a concentration of from about 0.005 to about 1.0 percent by weight of said flooding water.

5. The method of claim 1 wherein said flooding water containing said thickening agent is injected in a volume of from about 0.01 to about 0.25 pore volume.

6. The method of claim 1 wherein said flooding water containing said thickening agent has a pH of from about 7 to about 10.5.

7. The method of claim 1 wherein said flooding water containing said thickening agent also contains a surfactant.

8. The method of claim 7 wherein said surfactant is a water-soluble petroleum sulfonate having a molecular weight of from about 300 to about 500.

9. The method of claim 7 wherein said surfactant is present in a concentration of from about 0.01 to about 1.0 percent by weight of said flooding water containing said thickening agent.

10. The method of claim 1 wherein said flooding water containing said thickening agent also contains a bactericide comprising formaldehyde or an alkali metal chlorinated phenol.

11. The method of claim 1 wherein said thickening agent is a sulfoalkylated poly(glucosylglucan) formed by the reaction of poly(glucosylglucan), the glucosylglucan having the structural formula

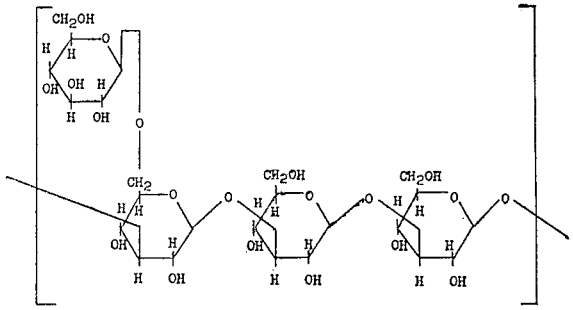

with a sulfoalkylating agent.

12. The method of claim 11 wherein said sulfoalkylating agent is either vinyl sulfonic acid, one of its reactive salts, β-chloroethyl sulfonic acid, one of its reactive salts, or propanesultone.

13. The method of claim 11 wherein said poly(glucosylglucan) has a molecular weight such that a 1 percent by weight aqueous solution thereof has a viscosity at 24° C. of at least 500 centipoises.

14. The method of claim 13 wherein said poly(glucosylglucan) has a molecular weight such that a 1 percent by weight aqueous solution thereof has a viscosity at 24° C. of from about 2,000 to about 3,000 centipoises.

15. The method of claim 14 wherein said poly(glucosylglucan) has a molecular weight such that a 1 percent by weight aqueous solution thereof has a viscosity at 24° C. of about 2,600 centipoises.

16. The method of claim 1 wherein said thickening agent is a sulfoalkylated polysaccharide B-1459 formed by the reaction of polysaccharide B-1459, the heteropolysaccharide produced by bacterium *Xanthomonas campestris* NRRLB-1459, United States Department of Agriculture, from glucose, with a sulfoalkylating agent.

17. The method of claim 16 wherein said sulfoalkylating agent is either vinyl sulfonic acid, one of its reactive salts, β-chloroethyl sulfonic acid, one of its reactive salts, or propanesultone.

18. A method of recovering oil from an oil-containing subterranean formation penetrated by an injection means and a production means which comprises injecting through said injection means and into said formation flooding water containing as a thickening agent a sulfoalkylated oxyethylated poly(glucosylglucan), a sulfoalkylated oxyethylated polysaccharide B-1459, or a mixture thereof;

said sulfoalkylated oxyethylated poly(glucosylglucan) comprising the reaction product formed by reacting a poly(glucosyglucan) having from 10 to 200 percent by weight of ethylene oxide in association therewith, the glucosylglucan having the structural formula

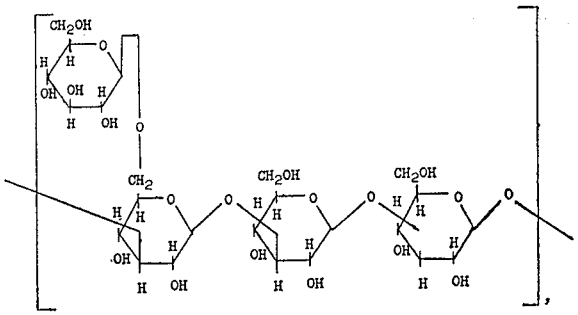

with a sulfoalkylating agent, and said sulfoalkylated oxyethylated polysaccharide B-1459 comprising the reaction product formed by reacting polysaccharide B-1459, the heteropolysaccharide produced by bacterium *Xanthomonas campestris* NRRL B-1459, United States Department of Agriculture, from glucose, having from 10 to 200 percent by weight of ethylene oxide in association therewith with said sulfoalkylating agent.

19. The method of claim 18 wherein said sulfoalkylating agent is either vinyl sulfonic acid, one of its reactive salts, β-chloroethyl sulfonic acid, one of its reactive salts, or propanesultone.

References Cited

UNITED STATES PATENTS

| | | | |
|---|---|---|---|
| 2,580,352 | 12/1951 | Grassie | 260—231 |
| 2,827,964 | 3/1958 | Sandiford et al. | 166—9 |
| 3,020,207 | 2/1962 | Patton. | |
| 3,046,272 | 7/1962 | Strating et al. | 260—233.3 |
| 3,057,855 | 10/1962 | Smith et al. | |
| 3,133,856 | 5/1964 | Neely. | |
| 3,163,602 | 12/1964 | Lindblom et al. | 252—8.55 |
| 3,208,518 | 9/1965 | Patton | 166—9 |
| 3,231,559 | 1/1966 | Wheeler et al. | 260—209 |
| 3,231,560 | 1/1966 | Keen et al. | 260—209 |
| 3,305,016 | 2/1967 | Lindblom et al. | 166—9 |

OTHER REFERENCES

Fischer, R. F., "Propane Sultone," *Industrial and Engineering Chemistry*, Vol. 56, No. 3, March 1964. (pp. 41–45 and 74), TP 1 A58.

STEPHEN J. NOVOSAD, *Primary Examiner.*